(No Model.)
R. KENT.
CUTTING AND PUNCHING MACHINE.
No. 257,590.      Patented May 9, 1882.
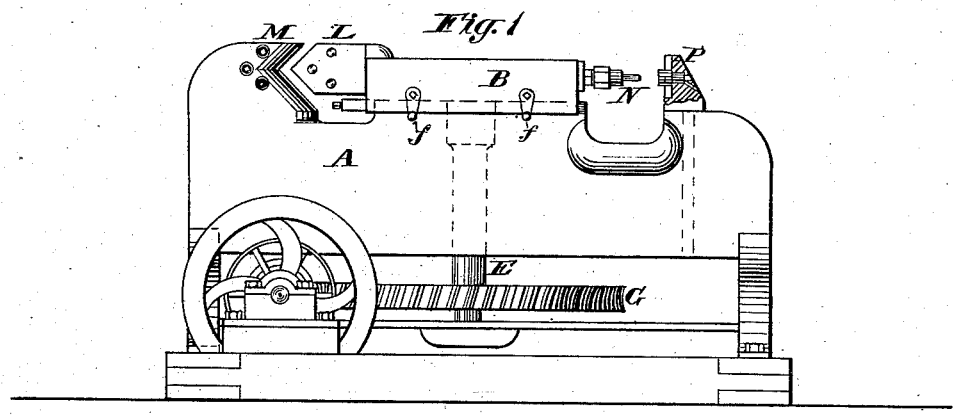
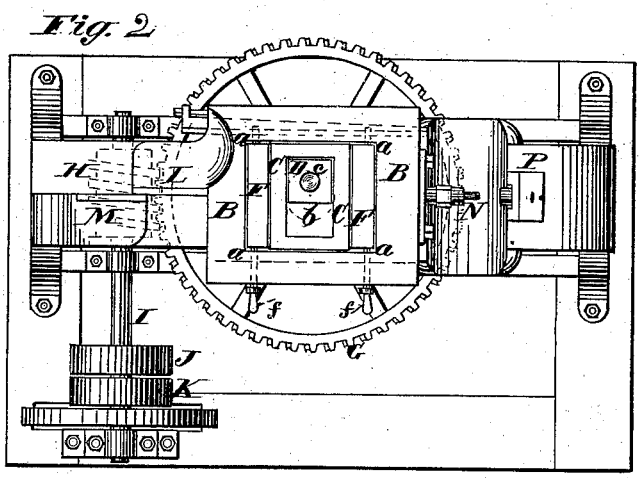
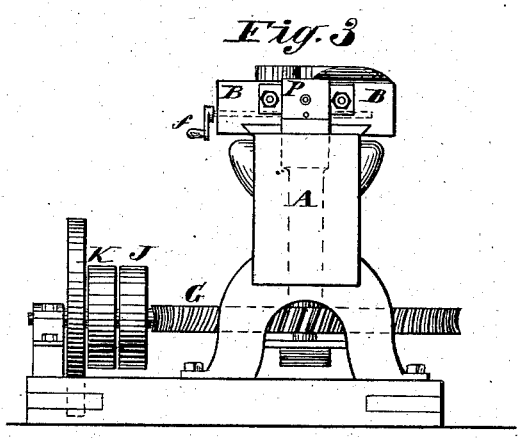
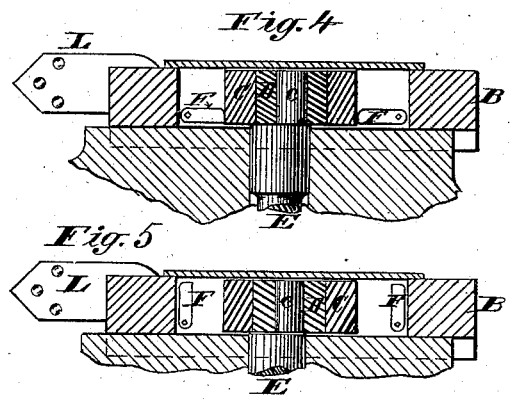
Witnesses:
Robert W. Matthews
Thomas E. Crossman
Inventor
Robert Kent
per James A. Whitney Atty

UNITED STATES PATENT OFFICE.

ROBERT KENT, OF BROOKLYN, NEW YORK.

CUTTING AND PUNCHING MACHINE.

SPECIFICATION forming part of Letters Patent No. 257,590, dated May 9, 1882.

Application filed October 19, 1881. (No model.)

*To all whom it may concern:*

Be it known that I, ROBERT KENT, of Brooklyn, in the county of Kings and State of New York, have invented certain Improvements in Apparatus for Cutting and Punching Metals, of which the following is a specification.

This invention comprises a novel combination of parts whereby the operations of cutting or shearing metal and of punching the same may be performed by one and the same machine, and whereby provision is made for readily stopping the motion of the cutting and punching devices irrespective of the movement of the driving-crank or eccentric.

Figure 1 is a side elevation, Fig. 2 is a plan view, and Fig. 3 an end view, of a machine embodied in my said invention. Figs. 4 and 5 are detail sectional views representing certain parts of said machine.

A is a strong supporting-frame, the upper side of which is shaped to form guides for a suitably-proportioned reciprocating head, B, preferably of substantially rectangular form, and having a large central opening, also preferably of rectangular form, as represented at $a$ in Fig. 2. The two inner lateral edges of this opening $a$ are V-shaped in their cross-section to provide guides for a block, C, the ends or lateral edges of which are longitudinally grooved to fit upon the guides formed laterally through the opening $a$, as aforesaid, so that the block C is supported within the opening $a$, and when freed from obstruction at each end, as hereinafter explained, is capable of sliding to and fro within the said opening. This block C is itself provided with a central rectangular opening, $b$, the longest sides of which are made V-shaped in their cross-section to form bearings or guides for a sliding crank-block, D, the corresponding edges of which are longitudinally grooved to fit upon the V-shaped guides of the block C, just described. The block C and the crank-block D may, if desired, be made of two coincident halves, in order that they may be readily fitted into their respective places, the said halves being bolted or otherwise suitably secured together, or any other means of fitting them into their respective places which may be suggested by ordinary workshop skill may be adopted.

E is a vertical shaft, which works in suitable steps or bearings provided in the frame A, and which has upon its upper end a crank or eccentric, $c$, more fully represented in Figs. 4 and 5. This crank $c$ works in a suitable circular bearing formed in the crank-block D, in such manner that the rotation of the crank will give a reciprocating motion to the block C in a direction parallel with the length of the frame A, the crank-block D meanwhile vibrating to and fro in the opening $b$ in order to permit the action of the said crank upon the aforesaid block C. When the block C is fixed with reference to the head B it follows as a matter of course that the reciprocating movement of the block C will be communicated to the head B, whereas if nothing be interposed between the block C and the adjacent ends of the opening $a$ of the head B the said block will vibrate to and fro within the said opening $a$ without communicating any motion to the head B.

In order to fix the block C with reference to the head B, there is provided transversely in each end of the opening $a$ a rocking bar, F— that is to say, a substantially flat bar, the ends of which are provided with pivots situated near the outer edge of the bar, and fitted into suitable bearings in the head B, so that when the said bars F are turned vertical, as represented in Fig. 5, they will leave a space between themselves and the adjacent sides of the block C, whereas when turned into a horizontal position, as represented in Fig. 4, they will occupy the spaces between the said block C and the adjacent ends of the opening $a$, and thereby prevent the block C from moving with reference to the head B, and, as a result, causing the movement of the crank $c$ to communicate the reciprocating movement to the head B.

In order that the bars F may be manipulated, as just described, with convenience and dispatch, one of the pivots of each of said bars is extended through the adjacent side of the head B, and has fitted upon its end a small crank, $f$, by turning which the bar may be turned up or down, as required. Motion is transmitted to the crank $c$ by means of a worm-wheel, G, into which gears a worm, (shown in dotted outline at H in Fig. 2,) and provided upon the shaft I, which in its turn is fitted with suitable pulleys, J and K, whereby it may be operated after the manner of any ordinary shafting, and which may, moreover, be furnished with a suitable balance-wheel. Upon one end of the head B is placed a cutter, L, which, as represented in the drawings, is designed for cutting angle-iron.

Provided upon the frame A opposite and adjacent to the cutter L is a fixed head or shoulder, M, so shaped as to receive and hold the angle-iron while the cutter L is acting thereon. Upon the opposite end of the head B is provided a punch, N, adjacent to which upon the frame A is a fixed shoulder, P, constructed and arranged to support the metal to be punched against the pressure and thrust of the punch N, and also to permit the action of the said punch.

In the operation of the apparatus the bars F are placed in their horizontal position in order that the head B, with its cutter L and punch N, may receive the requisite reciprocating movement, whereupon either the cutter L or the punch N may be used for their respective purposes, as occasion may require. When it is desired that the movement of the head B be stopped the bars F are thrown into their vertical position, as represented in Fig. 5, whereupon the block C plays to and fro within the opening $a$ without affecting or giving motion to the head B, the said head, and consequently its cutter and punch, being thereby fixed stationary. By means of my invention hereinbefore described I am enabled with a single machine to perform many varieties of metal-working which hitherto have required two distinct and separate machines, which together are much more expensive than the single machine embraced in my invention, as set forth.

What I claim as my invention is—

The combination of the head B, constructed with the opening $a$, the block C, placed within the opening $a$ of the head B, the crank-block D, placed within the opening $b$ of the block C, the crank $c$, working through a suitable bearing in the block D, and the bars F, pivoted, as described, to the head B at opposite sides of the block C, the whole constructed and arranged for joint use and operation, substantially as and for the purpose herein set forth.

ROBERT KENT.

Witnesses:
THOMAS E. CROSSMAN,
ROBERT W. MATTHEWS.